Patented Sept. 2, 1924.

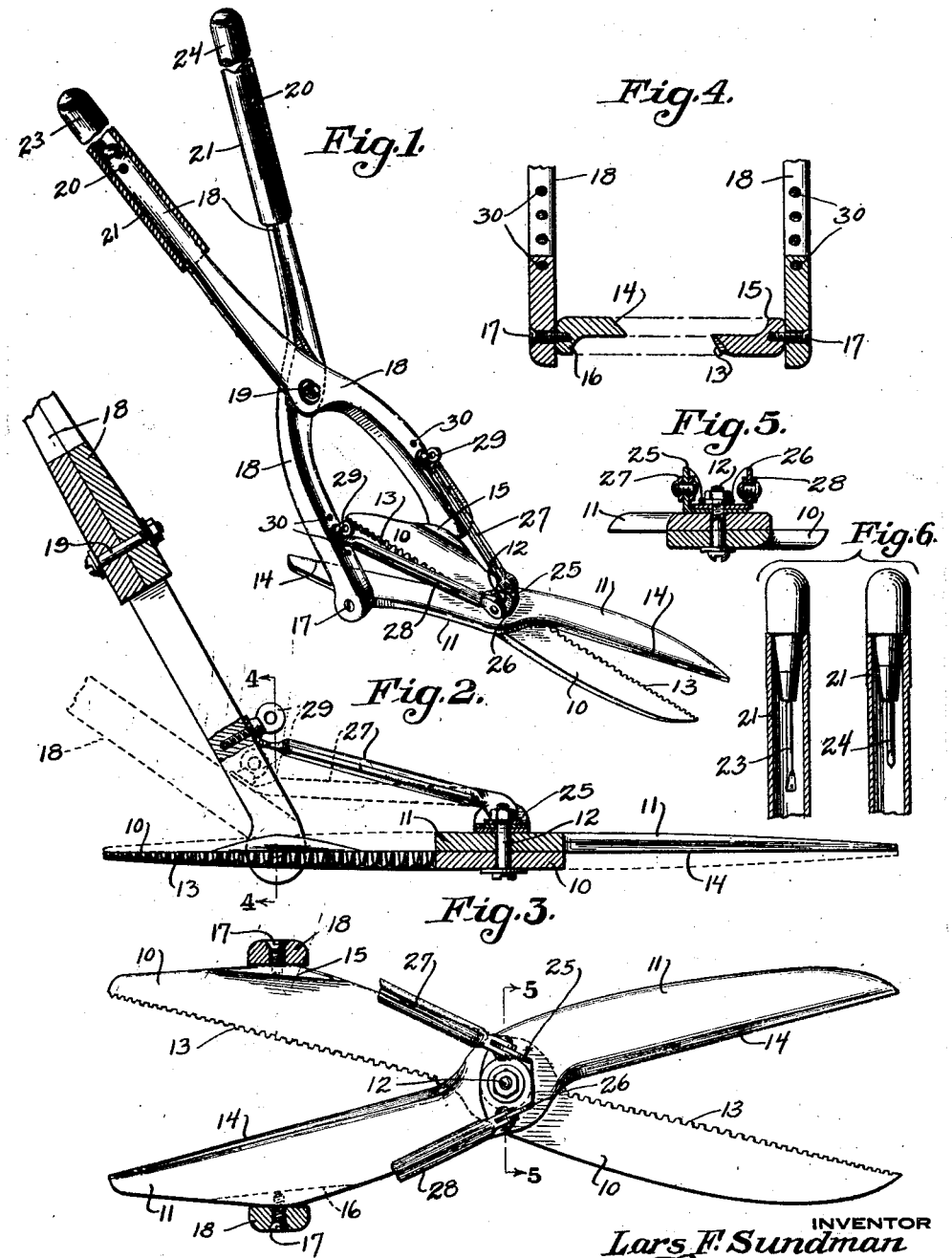

1,507,529

UNITED STATES PATENT OFFICE.

LARS FREDRICK SUNDMAN, OF NORMAL, ILLINOIS.

HEDGE TRIMMER.

Application filed June 13, 1923. Serial No. 645,147.

*To all whom it may concern:*

Be it known that I, LARS F. SUNDMAN, a citizen of the United States, residing at Normal, in the county of McLean and State of Illinois, have invented new and useful Improvements in Hedge Trimmers, of which the following is a specification.

This invention relates to a grass or hedge trimmer of the pivoted blade type, which is adapted to be carried in the hands and operated by pivoted handles in the same manner as tongs.

The general object of the invention is to provide a simply constructed hand implement for trimming shrubbery, hedges, lawns and the like, which may be easily manipulated in a limited space around walls, fence corners, and similar places inaccessible to larger and more complicated machines. The actuating handles are connected directly to the blades, all links, gears and the like being eliminated.

The invention also has among its objects to increase the efficiency and adaptability of the implement by pivoting the blades intermediate their ends so that they may cut both forwardly and backwardly, to insure a clean and uniform cut by providing the lower or ledger blade with a serrated edge, and to provide means for adjusting the angle between the handles and the plane of the blades, whereby the implement may be adapted for high or low cutting or for persons of different height.

With the above and other objects in view, the invention consists in certain details of construction and combinations of elements which will be more particularly described in connection with the accompanying drawing, and subsequently pointed out in the claims.

In the drawing:—

Fig. 1 is a perspective view of the invention.

Fig. 2 is a longitudinal sectional view thereof.

Fig. 3 is a plan view of the cutting blades with a portion of the operative connections.

Fig. 4 is a detail sectional view on the line 4—4 of Fig. 2.

Fig. 5 is a detail sectional view on the line 5—5 of Fig. 3.

Fig. 6 is a detail sectional view of the upper ends of the handle extensions.

Referring more particularly to the drawing, the invention includes a pair of blades 10 and 11, which are centrally connected by a pivot bolt 12, and extend forwardly and rearwardly therefrom, the lower or ledger blade 10 being formed in front of and in rear of its pivot with similar serrated edges 13, and the upper plate 11 being formed with cutting edges 14 which cooperate therewith. The front and rear portions of the blades 10 and 11 are similarly shaped except that the rearwardly-extending portions are preferably formed with thickened portions 15 and 16 at their outer edges near the ends of the blades to provide threaded sockets for receiving screws 17 to which the lower ends of the pivoted handles 18 are pivotally connected.

The handles 18 are intermediately pivoted to each other by means of a pivot bolt 19 and may be operated tong fashion in order to close and open the blades 10 and 11. When the implement is used for trimming lawns or other work near the ground, it is preferable to provide the handles 18 with extensions 21 which are preferably hollow and telescope over the extremities of the handles 18, and are secured thereto by means of screws 20 or the like. The outer ends of the extensions 21 may terminate in sockets adapted to receive the handles 22 of certain tools, as for example, the screw driver 23 and punch 24 shown in Fig. 6, or other tools which it may be convenient to have available.

A pair of ears 25 and 26 are pivotally secured on the pivot bolt 12, and pivotally connected thereto are bracing links 27 and 28, the upper ends of the links being pivotally connected to the lower ends of the handles 18 by means of shouldered thumb screws 29. A plurality of threaded holes 30 are provided in the arms 18 for receiving the screws 29, whereby the angle between the plane of the arms 18 and the plane of the blades 10 and 11 may be adjusted to suit the height of the operator and for most conveniently performing the particular work to be done. The screw connections 29 also have the additional advantage that the upper ends of the links 27 and 28 may be entirely disconnected from the arms 18 and the latter folded into juxtaposition to the blades 10 and 11, so that the entire implement may be folded into a compact space when packing for shipment or the like.

It will be understood that the connections between the screws 17 and the arms 18, as well as the connections between the screws 29 and the links 27 and 28 are sufficiently loose to allow a certain amount of play, owing to the slight difference in angular relation between the arms 18 and the blades, during the opening and closing movement of the latter. The blades cut forwardly and backwardly at the same time, thus increasing their capacity as well as their adaptability to different places difficult of access. The lower or ledger blade 10 is provided with serrated teeth which are of particular advantage in cutting blades of fine grass, since they prevent the same from slipping through without being cut. The handles may be set at widely varying angles, the uppermost holes 30 being particularly desirable for cutting grass, and the lower holes being more especially used when cutting hedges or shrubbery at a considerable height.

The invention may be constructed at a very moderate expense and is of great value in taking care of small lawns and hedges, as well as to supplement the larger machines and to trim around corners that cannot be reached by the latter.

While I have shown and described the details of construction of the preferred form of the invention, it is to be understood that this is merely illustrative and that various modifications may be made therein within the scope of what is claimed without departing from the spirit of the invention, or sacrificing any of the advantages thereof.

What is claimed is:—

1. A cutting implement comprising a pair of pivoted blades with cooperating cutting edges, a pair of handles pivoted to each other and having their lower ends pivotally connected to the respective blades in rear of their pivot, and bracing links pivotally connected at one end to the blades and at the other end to the respective handles.

2. A cutting implement, comprising a pair of pivoted blades with cooperating cutting edges extending in both directions from their pivot, a pair of handles pivoted to each other and connected to said blades for actuating the same, bracing links pivotally connected at one end to the blades and at the other end to the respective handles and holding said handles in angular relation to the plane of the blades, and extensions for said handles having interior tool receiving cavities.

3. A cutting implement comprising a pair of pivoted blades with cooperating cutting edges, a pair of pivotally connected handles movable to actuate said blades, bracing links pivotally connected at one end to the blades and at the other end to the respective handles and holding the latter in angular relation to the plane of the blades, and means for adjusting the pivotal connections between the links and handles longitudinally of said handles to vary the angle between the plane of the handles and the plane of the blades.

4. A cutting implement comprising a pair of blades, a pivot pin on which the blades are centrally pivoted, a pair of handles pivoted to each other and having their lower ends pivotally connected to the respective blades in rear of their pivot, a pair of ears pivotally mounted on said pivot pin, and bracing links pivoted at their lower ends to the respective ears and adjustably connected at their upper ends to the respective handles whereby to adjust the angular relation between the plane of the handles and the plane of the blades.

5. A cutting implement comprising a pair of blades, a pivot pin on which the blades are centrally pivoted, a pair of handles pivoted to each other and having their lower ends pivotally connected to the respective blades in rear of their pivot, and bracing links pivoted to the blades adjacent the pivot of the latter, and means for adjustably connecting said links to the handles above the pivotal connection of the handles to the blades.

6. A cutting implement comprising a pair of pivoted blades with cooperating cutting edges, a pair of crossed handles disposed in a plane forming an angle with the plane of the blades and pivotally connected together at their point of crossing and having their lower ends spaced apart and pivotally connected to the outer sides of the blades in rear of their pivot, bracing links pivotally connected at one end to the blades and at the other end to the respective handles, and means for adjusting the pivotal connections between the links and handles longitudinally of said handles to vary the angle between the plane of the handles and the plane of the blades.

In testimony, that I claim the foregoing as my own, I have hereto affixed my signature.

LARS FREDRICK SUNDMAN.